US008923808B2

(12) United States Patent
Miller et al.

(10) Patent No.: US 8,923,808 B2
(45) Date of Patent: Dec. 30, 2014

(54) METHOD AND APPARATUS FOR POLICY AND CHARGING CONTROL DECISIONS BASED ON RADIO SPECTRUM BLOCKS

(75) Inventors: Trent J. Miller, West Chicago, IL (US);
James A. Marocchi, Winfield, IL (US);
Deborah J. Monks, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 955 days.

(21) Appl. No.: 12/788,498

(22) Filed: May 27, 2010

(65) Prior Publication Data

US 2011/0294435 A1    Dec. 1, 2011

(51) Int. Cl.
*H04M 11/00* (2006.01)
*H04L 12/24* (2006.01)

(52) U.S. Cl.
CPC .................... *H04L 41/0893* (2013.01)
USPC ........... 455/405; 455/406; 455/407; 455/408; 455/403

(58) Field of Classification Search
USPC .......................... 455/405, 406, 407, 408, 403
See application file for complete search history.

(56) References Cited

U.S. PATENT DOCUMENTS

| 7,954,002 | B2 * | 5/2011 | Qiang ............................. 370/216 |
| 8,195,133 | B2 * | 6/2012 | Ramer et al. ................ 455/414.1 |
| 8,249,551 | B2 * | 8/2012 | Jones et al. .................... 455/406 |
| 2007/0224988 | A1 * | 9/2007 | Shaheen ........................ 455/436 |
| 2007/0249339 | A1 * | 10/2007 | Tamura et al. ................. 455/433 |
| 2008/0305825 | A1 * | 12/2008 | Shaheen ..................... 455/552.1 |
| 2009/0182883 | A1 * | 7/2009 | Giaretta et al. ................ 709/228 |
| 2009/0280823 | A1 * | 11/2009 | Petrovic et al. ................ 455/453 |
| 2010/0197268 | A1 * | 8/2010 | Raleigh .......................... 455/408 |

FOREIGN PATENT DOCUMENTS

| EP | 1874070 A1 | 1/2008 |
| WO | 0189249 A1 | 11/2001 |

OTHER PUBLICATIONS

3GPP TS 23.203, V9.2.0; 3RD Generation Partnership Project; Technical Specification Group Services and System Aspects; Policy and Charging Control Architecture (Release 9); Sep. 2009; 120 Pages.
3GPP TS 23.401, V9.2.0; 3RD Generation Partnership Project; Technical Specification Group Services and System Aspects; General Packet Radio Service (GPRS) Enhancements for Evolved Universal Terrestrial Radio Access Network (E-UTRAN) Access (Release 9); Sep. 2009; 245 Pages.
PCT International Search Report Dated Jun. 9, 2011.

(Continued)

*Primary Examiner* — Sharad Rampuria
*Assistant Examiner* — Sayed T Zewari
(74) *Attorney, Agent, or Firm* — Valerie M. Davis; Steven A. May; Daniel R. Bestor

(57) ABSTRACT

A policy determination function (PDF) makes policy and charging control decisions based on radio spectrum blocks. More particularly, the PDF: receives radio spectrum block data via an interface; and determines, using the radio spectrum block data, a first radio spectrum block for use during a session for a subscriber, wherein the first radio spectrum block is one of a plurality of radio spectrum blocks, and wherein the subscriber has a unique set of policy and charging control (PCC) rules corresponding to each of the radio spectrum blocks in the plurality. The PDF further selects and provides to a policy enforcement function the set of PCC rules for the subscriber corresponding to the first radio spectrum block, for applying to communications with the subscriber during the session.

17 Claims, 4 Drawing Sheets

(56) References Cited

OTHER PUBLICATIONS

J.J.P. Balbas, et al. "Policy and Charging Control in the Evolved Packet System", IEEE Communications Magazine, IEEE Service Center, Piscataway, USA. vol. 47, No. 2, Feb. 1, 2009; p. 68-74, XP011280741, ISSN: 0163-6804; DOI:10.1109/MCOM.2009.4785382.

Nokia Siemens Networks: "Revised 700 MHz Band Plan" 3GPP Draft; R4-071472, 3RD Generation Partnership Project (3GPP), Mobile Competence Centre; France; vol. RAN WG4, No. Athens, Greece; Aug. 27, 2007; XP050177912.

Sok-Ian Sou, et al. "Signaling Overhead of Policy and Online Charging Control for Bearer Sessions in LTE Network" Consumer Electronics, 2009, ISCE '09, IEEE 13TH Inlternational Symposium on, IEEE, Piscataway, NJ, USA; May 25, 2009; p. 593-597; XP031484498, ISBN: 978-1-4244-2075-2.

* cited by examiner

METHOD AND APPARATUS FOR POLICY AND CHARGING CONTROL DECISIONS BASED ON RADIO SPECTRUM BLOCKS

TECHNICAL FIELD

The technical field relates generally to communication systems and more particularly to policy and charging control decisions based on radio spectrum blocks.

BACKGROUND

The radio spectrum refers to the part of the electromagnetic spectrum (i.e. the range of all possible frequencies of electromagnetic radiation or self-propagating waves) corresponding to radio frequencies; that is, frequencies lower than around 300 GHz. To facilitate use of the radio spectrum, it is government regulated. For example, in the United States (U.S.), the usage of frequencies is regulated by the Federal Communications Commission (FCC). Part of this regulation includes a division of the radio spectrum into several frequency bands or ranges of radio frequencies. One or more of the frequency bands are further divided into smaller frequency bands (also referred to herein as radio spectrum blocks), which are licensed, for example, to core network owners (also generally known as Carrier Organizations or simply Carriers) who own and manage the core network infrastructure equipment used to provide wireless services for subscribers, or licensed to other entities such as trusts. As used herein, the term "subscribers" refers at least to user equipment (UE), and may in some instances also refer to the users of the UE.

Current communication systems are designed such that there is one core network per radio spectrum block. However, with the tremendous increase in users of wireless services over the years and other factors including budget constraints, an increasingly likely scenario is the sharing of core networks by different types of users such as commercial (or public) users and public safety (or private) users. Since the licensing of some radio spectrum blocks is still ongoing in the U.S. (such as the licensing of radio spectrum blocks in the 700 MHz frequency band spanning the frequency range of 698-806 MHz), it is anticipated that a single core network may span or service multiple radio spectrum blocks with at least some of the subscribers being authorized to connect to the core network in more than one of the multiple radio spectrum blocks. In such a case, a consequently new phenomenon may arise in the future, wherein a subscriber connected to a core network is authorized to use multiple radio spectrum blocks in the network, each having different policy and charging control rules associated with the subscriber. Since this is a new wireless communication operating paradigm, there are no current solutions that address policy and charging control decisions for a subscriber authorized to use multiple radio spectrum blocks served by one or more core networks.

Thus, there exists a need for a method and apparatus for policy and charging control decisions based on radio spectrum blocks.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
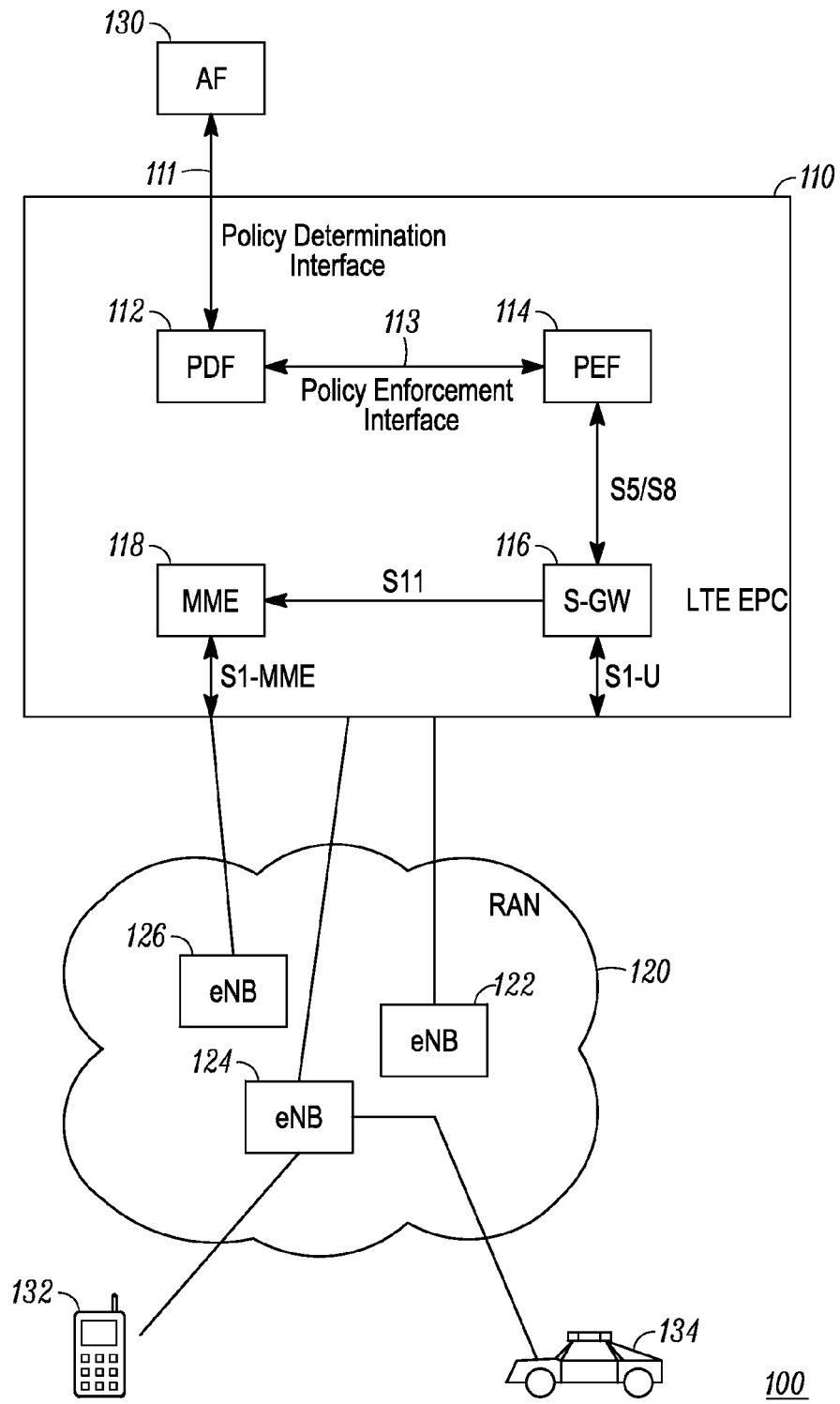
FIG. 1 is a diagram of a communication system that implements policy and charging control decisions based on radio spectrum blocks in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a policy determination function (PDF) makes policy and charging control decisions based on radio spectrum blocks. More particularly, the policy determination function: receives radio spectrum block data via an interface; and determines, using the radio spectrum block data, a first radio spectrum block for use during a session for a subscriber, wherein the first radio spectrum block is one of a plurality of radio spectrum blocks, and wherein the subscriber has a unique set (wherein "set" as used herein means one or more) of policy and charging control rules corresponding to each of the radio spectrum blocks in the plurality. The policy determination function further selects and provides to a policy enforcement function (PEF) the set of policy and charging control rules for the subscriber corresponding to the first radio spectrum block, for applying to communications with the subscriber during the session.

The disclosure herein: provides a means to support frequency-specific Quality of Service (QoS) and billing rules when multiple radio spectrum blocks are supported by one or more Evolved NodeB devices, abbreviated herein as eNB or eNodeB; is highly valuable for a public-private Long Term Evolution (LTE) partnership because it allows a single LTE core to be shared between public and private users, which provides a significant cost advantage for public safety; provides a framework to realize FCC 700 MHz frequency-specific requirements; and enables C/D/PSST blocks (and other adjacent spectrum blocks within the 700 MHz frequency band) to be shared, thereby, increasing spectral efficiency. Those skilled in the art will realize that the above recognized advantages and other advantages described herein are merely illustrative and are not meant to be a complete rendering of all of the advantages of the various embodiments.

Referring now to the drawings, and in particular FIG. 1, a communication system in accordance with some embodiments is shown and indicated generally at 100. System 100 includes system elements of: an application function (AF) 130; user equipment (UE) 132 and 134; a core infrastructure 110 (also referred to herein as a packet data network (PDN) or a core network), which in this illustrative embodiment is an LTE evolved packet core (EPC) having a number of logical elements, including a policy determination function (PDF) 112, a policy enforcement function (PEF) 114, a signaling gateway (S-GW) 116, and a mobility management entity (MME), as described in more detail below; and an access network (in this case a radio access network (RAN)) 120 that includes a plurality of infrastructure devices, 122, 124, 126, which in this LTE implementation are eNodeB Devices.

In this illustrative embodiment, system 100 is an LTE system, meaning that elements of the system, including at least the UEs, the EPC logical elements, and the RAN eNodeBs implement protocols and signaling in accordance with a set of enhancements to the Universal Mobile Telecommunications System (UMTS), which is described in a suite of Technical Specifications (TS) developed within and published by $3^{rd}$ Generation Partnership Project (3GPP), with the most recent version of the 3GPP TSs being published in March 2010 as a revised "Release 9" (with Release 10 currently being developed). However, the specifics of this example are merely illustrative of some embodiments, and the teachings set forth herein are applicable in a variety of alternative settings.

For example, since the teachings described do not depend on the particular standard being used, they can be applied to any type of system that includes a core network having a policy determination function that performs policy and/or charging control decision making (used for instance in QoS management) and a policy enforcement function; such as, for instance, to a WiMAX (Worldwide Interoperability for Microwave Access) system. However, in the WiMAX system or other system of a different technology, the logical elements of the PDF 112 and PEF 114 (and their corresponding interfaces) may be implemented in different network elements than those that implement the same functionality in the LTE system (e.g., a PCRF (Policy and Charging Rules Function) implementing the PDF functionality and a PGW (packet data network gateway) implementing the PEF functionality). Likewise, the functionality of the MME 118 and S-GW 116 may be implemented in different network elements depending on the given technology being used.

As such, many implementations are contemplated and are within the scope of the various teachings described. For instance, the teachings herein are applicable to, but not limited to, the following two implementation scenarios. The first illustrative implementation scenario involves different radio spectrum blocks of the same radio access network technology (e.g., an LTE D block and an LTE PSST (Public Safety Spectrum Trust) block both serviced by the same core network). The second illustrative implementation scenario involves different radio spectrum blocks of different radio access network technologies (e.g., an LTE PSST block and a WLAN (Wireless Local Area Network) 2.4 GHz block both serviced by the same core network).

Moreover, only a limited number of system elements and one access network are shown in the diagram, but more system elements and access networks may be included in an actual commercial or private system implementation. In addition, the access network can be any type of access network, including any 2G, e.g., Global System for Mobile Communication (GSM) or 3G, e.g., Universal Mobile Telecommunications System (UMTS), access network.

In general, the UE, the AF 130, the LTE EPC 110 logical elements, and the eNodeBs are each implemented using (although not shown) a memory, one or more network interfaces, and a processing device that are operatively coupled, and which when programmed form the means for these system elements to implement their desired functionality, for example as illustrated by reference to the method and corresponding signaling diagrams shown in FIG. 2 to FIG. 4. The network interfaces are used for passing signaling (e.g., messages, packets, datagrams, frames, superframes, and the like) between the elements of the system 100. The implementation of the network interface in any particular element depends on the particular type of network, i.e., wired and/or wireless, to which the element is connected.

For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

Figure 3:
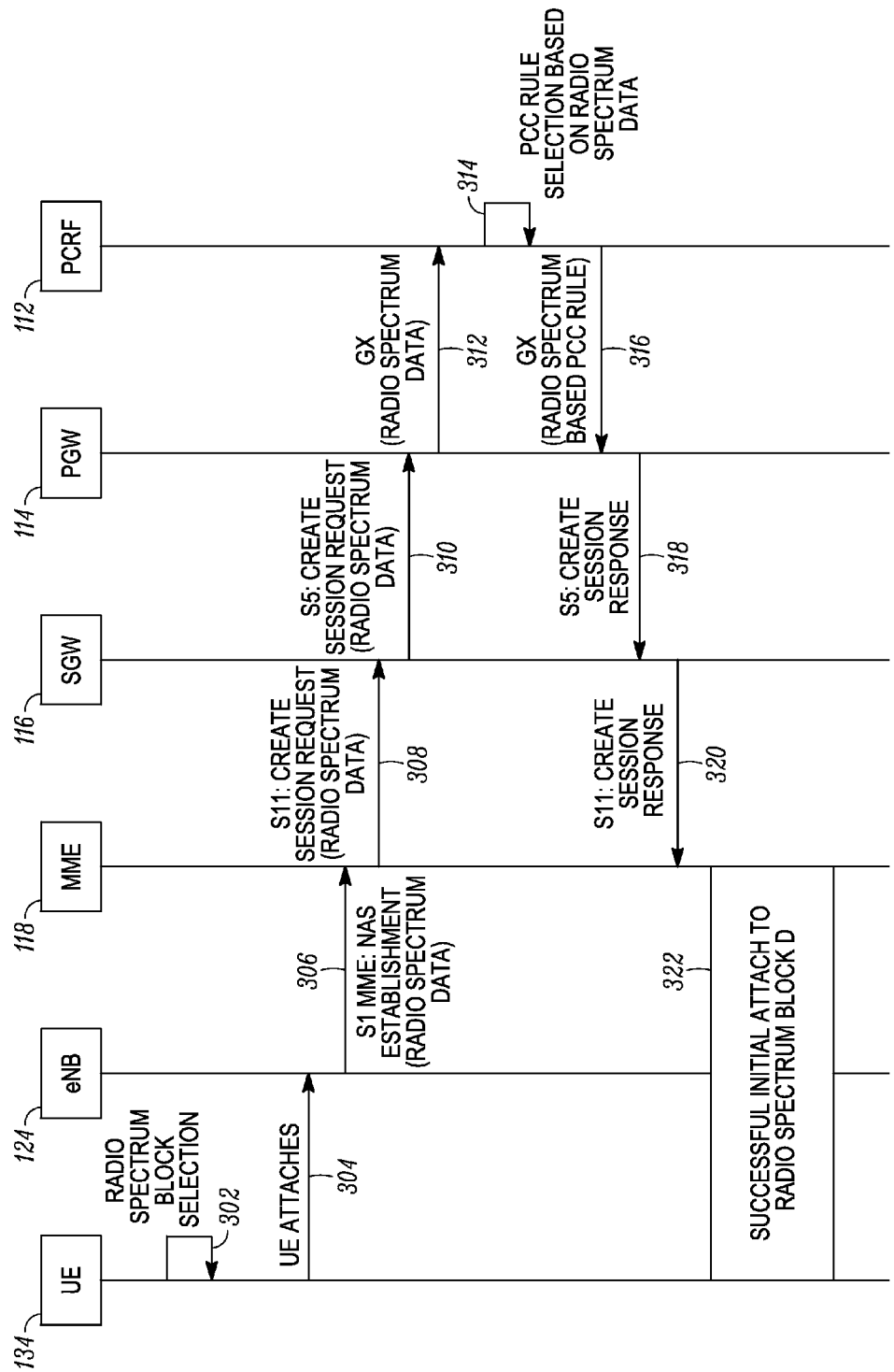
FIG. 3 is a signaling diagram illustrating policy and charging control decisions based on radio spectrum blocks, implemented in a Long Term Evolution system, in accordance with some embodiments.
Figure 4:
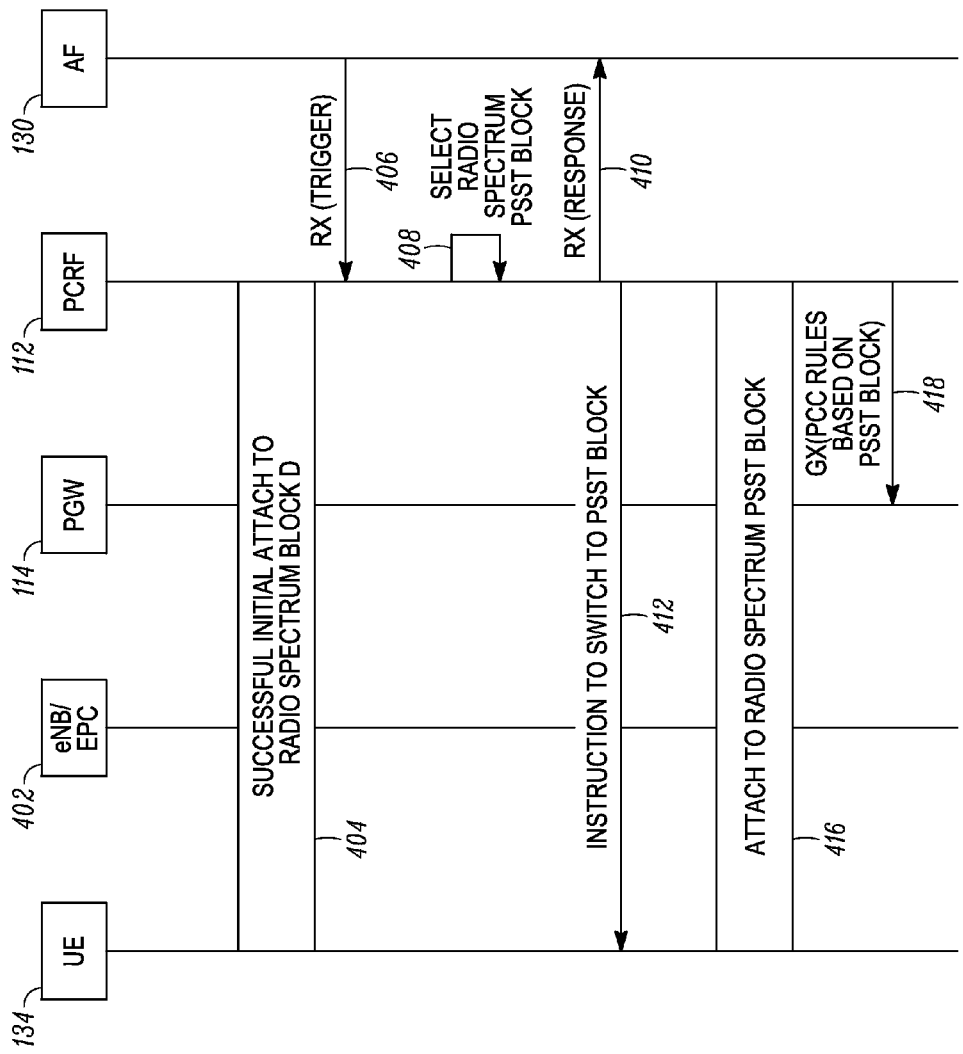
FIG. 4 is another signaling diagram illustrating policy and charging control decisions based on radio spectrum blocks, implemented in a Long Term Evolution system, in accordance with some embodiments.

The processing device utilized by the UE, the AF 130, the LTE EPC 110 logical elements, and the eNodeBs may be programmed with software or firmware logic or code for performing signaling such as that included in signaling diagrams illustrated in FIGS. 3 and 4; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the system elements shown in FIG. 1, which will aid in the understanding of the later description of the method and signaling illustrated in FIGS. 2 to 4. The UE 132 and 134 (also referred to herein, interchangeably, as subscribers), which are also referred to in the art as communication devices, access devices, access terminals, mobile stations, mobile subscriber units, mobile devices, user devices, and the like, can be any standard communication device such as radios, mobile phones, mobile data terminals, Personal Digital Assistants (PDAs), laptops, two-way radios, cell phones, and any other device capable of operating in a wired or wireless environment and that can be used by public users (such as commercial users) or private users (such as public safety users).

The AF 130 represents a network element that supports applications (executed in a processing device) or provision of services that require dynamic policy and/or charging control such as is needed for QoS management, such as in providing various media (e.g., video, data, etc.) to UE, providing resource usage data, etc. In an embodiment, the AF 130 is included in a network infrastructure element of a public land mobile network (PLMN) of a service provider or public safety agency to which a UE has access. As such, the network element that includes the AF 130 may be, for instance, a computer aided dispatch (CAD) server, a media server, etc.

The LTE EPC 110, as referred to herein, is an all-IP core network that provides mobile core functionality that, in previous mobile generations (2G, 3G), has been realized through two separate sub-domains: circuit-switched (CS) for voice and packet-switched (PS) for data. The LTE EPC 110 enables the above-mentioned all IP end-to-end delivery of media: from mobile handsets and other user equipment with embedded IP capabilities, over IP-based Evolved NodeBs (LTE base stations), across the EPC and throughout the application domain, IMS (IP Multimedia Subsystem) and non-IMS.

As mentioned above, The LTE EPC 110 comprises the logical components of the PDF 112, the PEF 114, the S-GW 116, and the MME 118. The PDF 112 and PEF 114 are generic terms for the network elements in the LTE EPC that perform the corresponding functionality; the particular LTE network elements, e.g., the PCRF, PGW, etc., are later described. Moreover, as mentioned above, the particular network element that performs the functionality of the PDF 112, PEF 114, S-GW 116, and MME 118 depends on the particular technology and associated protocols being implemented in the system. Furthermore, these logical entities are shown as separate logical blocks and indeed can, in some embodiments, each be included in separate hardware devices or can, alternatively, be combined in one or more hardware devices. Also, the LTE EPC 110, depending on the size of the network, may have several such components serving thousands or tens of thousands of UE and serving many AFs.

Turning first to the PDF 112, as the term is used herein, a policy determination function is defined as a logical element that provides for, identifies, stores, or otherwise obtains operator-defined policy and charging control (PCC) rules for resource allocation and usage. As used herein, a PCC decision includes a determination of PCC rules provided by the PDF to the PEF. A PCC rule is defined as a set of information enabling the detection of a service data flow and providing parameters for policy control and/or charging. Policy control is defined as a process whereby the PDF indicates to the PEF how to control a bearer for a UE. Policy control includes QoS control and/or gating control. Charging control is defined as a process of associating packets, belonging to a service data flow, to a charging key and applying online charging and/or offline charging, as appropriate. In accordance with the present disclosure, at least some of the PCC rules (both for policy and/or for charging control) with which the PDF is provisioned (either statically or dynamically) are frequency-based, meaning that a unique set of PCC rules is applied to communications for a particular UE (and/or user of the UE) depending on the radio spectrum block to which the UE is attached. This is novel over prior art systems, as there was no need in prior systems for such frequency-based PCC rules.

For example, one or more policy rules are frequency based, including but not limited to the following: admission and retention priority; whether or not a service data flow can be preempted; whether or not a service data flow can use resources obtained from another flow to grow its bandwidth usage; QoS Class Identifiers; authorization as to which AF may use each radio spectrum block; authorization as to which UEs may use each radio spectrum block; authorization as to which AF may be used based on a given radio spectrum block; role-based policy (e.g., the chief of can use any radio spectrum block, but streets and sanitation can only use specific radio spectrum blocks), bandwidth limitations for each radio spectrum block, etc. In another example, one or more charging control rules are frequency based, including but not limited to, offline charging being used for one or more of the radio spectrum blocks and offline charging being used for other radio spectrum blocks.

The following additional definitions will further assist in understanding the teachings herein. A bearer is defined as a transmission path in a network (such as a RAN) and is used to carry UE data traffic (also termed, herein, as communications or service data flows (SDFs)). An LTE bearer extends between the UE and the PGW and encompasses both a wireless path (UE to eNB), as well as a network transport path (eNB to PGW). A bearer can be a dedicated bearer or a default bearer and has associated therewith a set of characteristics or attributes including, but not limited to, QoS, a carrier frequency at which data is modulated, a particular bandwidth, bit rate, etc. A bearer is deemed a "physical channel" when it occupies resource blocks (e.g. 180 kHz frequency blocks) for a period of time for a UE transmission. A default bearer is defined as a non-GBR (guaranteed bit rate) bearer that provides for "best effort" SDF transmission and is granted to a UE for the duration of its connection to a PDN, e.g., the LTE EPC 110, and need not be explicitly requested. A dedicated bearer is defined as any additional bearer that is established for the same UE and is specifically requested by (or on behalf of) a UE and can be either non-GBR or GBR.

The functionality of the PDF can be placed in any suitable network element of the EPC. However, in this illustrative 3GPP embodiment, the functionality of the PDF 112 is performed by a Policy and Charging Rules Function (PCRF). Therefore, later in describing the signaling diagrams shown in FIG. 3 and FIG. 4, the PDF 112 is referred to as the PCRF 112. The PDF 112 is coupled to the AF 130 via a policy determination interface 111. In the LTE embodiment, interface 111 is an Rx interface, which serves as a transmission path through a wired network for communicating Rx messages. The Rx messages sent over the Rx interface are called Rx AAR messages (from the AF to the PCRF) and Rx AAA messages (from the PCRF to the AF).

The PDF 112 is further coupled to the Policy Enforcement Function (PEF) 114 via a policy enforcement interface 113. As the term is used herein, a policy enforcement function is defined as a network element that applies or enforces the operator-defined rules for resource allocation and usage. The functionality of the PEF can be placed in any suitable logical element of the EPC. However, in this illustrative 3GPP embodiment, the functionality of the PEF 114 is performed by a packet data network gateway (PGW) (and more particularly by a Policy and Charging Enforcement Function (PCEF) in the PGW). Therefore, later in describing the signaling diagrams shown in FIG. 3 and FIG. 4, the PEF 114 is referred to as the PGW 114. However, in other LTE embodiments, the PEF 114 is at least partially implemented in a Bearer Binding and Event Reporting Function (BBERF).

As mentioned above, the PDF is coupled to the PEF via a policy enforcement interface 113. Interface 113, in this LTE embodiment, comprises an "enhanced" Gx interface 113 that serves as a transmission path for communicating Gx messages. The Gx interface is referred to as "enhanced" because it enables the sending of novel signaling in accordance with the teachings herein. The Gx messages sent over the Gx interface are called Gx RAR messages (from the PCRF to the PCEF) and Gx RAA messages (from the PCEF to the PCRF).

The S-GW 116 is connected to the PEF (particularly the PGW) 114 via "enhanced" interfaces and transmission paths S5 (in a non-roaming architecture) and S8 (in a roaming architecture) and to the RAN 120 via an "enhanced" S1-U interface and transmission path, in accordance with the disclosed teachings. The S-GW 116 is a data plane element whose primary function is to manage user-plane mobility and act as a demarcation point between the RAN and core networks. The S-GW 116 maintains data paths between eNodeBs in the RAN and the PGW. From a functional perspective, the S-GW 116 is the termination point of the packet data network interface towards the RAN. When a UE moves across areas served by eNodeB elements in the RAN, the S-GW 116 serves as a local mobility anchor, which means that packets are routed through this point for intra RAN mobility and mobility with other 3GPP technologies, such as 2G/GSM and 3G/UMTS.

The MME 118 is connected to the S-GW 116 via an "enhanced" S11 interface and transmission path and to the RAN 120 via an "enhanced" S1-MME interface and transmission path, in accordance with the disclosed teachings. The MME 118 performs the signaling and control functions to manage the UE access to network connections, the assignment of network resources in the cells of the RAN, and the management of the mobility states to support tracking, paging, roaming and handovers, and the control of all control plane functions related to subscriber and session management. Accordingly, the MME 118 performs the bearer management control functions to establish the bearer paths that are used by the UE. Additional known elements and interfaces in a LTC EPC as described in the 3GPP TS for LTE that are needed for a commercial or private embodiment of the LTE EPC 110 are not shown in FIG. 1 for ease of illustration.

RAN 120 in this embodiment is a E-UTRAN (Evolved UMTS Terrestrial Radio Access Network) comprising multiple cells each having an ENodeB, e.g., 122, 124, 126, which serve as the intermediate infrastructure device between the UE and the LTE EPC 110 and a point of access for the UE to allocated bearers. Each cell represents a geographic coverage area that provides the wireless resources termed herein as "bearers" for carrying data (or SDFs) for UE connected to the RAN. A UE is deemed "connected" or "attached" to the RAN when it has successfully authenticated with the core infrastructure and can access an eNodeB to use bearer resources and when the UE to MME signaling connection has been established.

Thus, a "connection" or "successful attachment" of a UE to an access network represents a communication channel, which results from a call establishment procedure between the UE, the access network, and the core network. Accordingly, a connection may comprise the UE establishing a communication session (or simply session) with another device; wherein a session is defined as an interactive information exchange between the RAN and the UE that is set up or established at a certain point in time and torn down at a later point in time. For example, sessions can be established, modified, and terminated using various call control protocols including, but not limited to Session Initiation Protocol. Sessions can be triggered via an Rx message between the AF and the PCRF; and sessions can be established using any suitable application level signaling.

Figure 2:
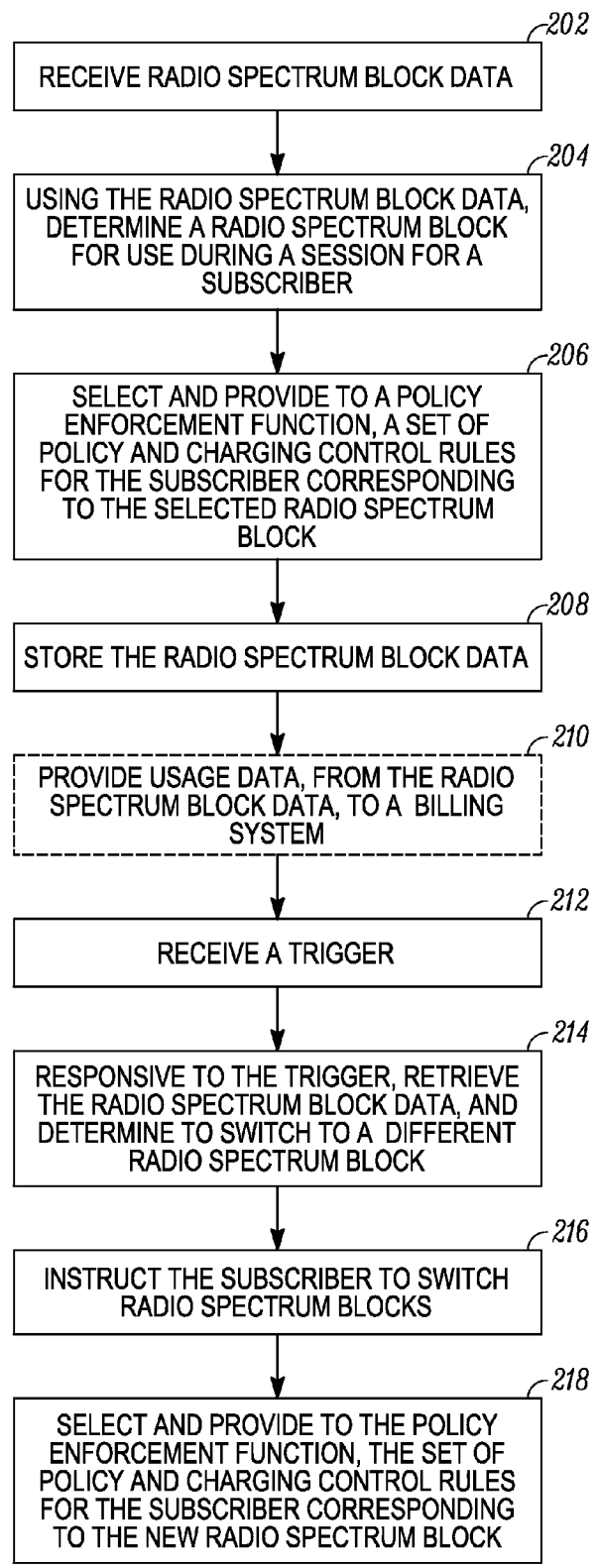
FIG. 2 is a flow diagram illustrating a method for policy and charging control decisions based on radio spectrum blocks in accordance with some embodiments.

Turning now to FIG. 2, a flow diagram of a method for policy and charging control decisions based on radio spectrum blocks is shown and generally indicated at 200. The functionality illustrated by method 200 is performed in a policy determination function such as the PCRF in an LTE system. The signaling diagrams shown in FIG. 3 and FIG. 4 are LTE embodiments that illustrate the functionality of method 200. Therefore, FIGS. 2, 3, and 4 will be described concurrently to aid in a better understanding of the disclosure. The messaging (and related illustrated functionality) shown in FIG. 3 is by and between the UE 134, the eNB 124, the MME 118, the SGW 116, the PGW 114, and the PCRF 112. The messaging (and related illustrated functionality) shown in FIG. 4 is by and between the UE 134, an eNB/EPC 402 (which includes the eNB 124, the MME 118, and the SGW 116), the PGW 114, the PCRF 112, and the AF 130. The format of messages exchanged between the devices shown in FIG. 3 and FIG. 4 depends on the particular network and, where applicable, the air interface and modulation schemes implemented in the system elements or any internal interfaces within the devices. The format of messages exchanged between the devices is compatible with the 3GPP TS for LTE; however, the content of some of these messages is uniquely adapted for the teachings herein as described later in further detail.

Returning again to method 200 of FIG. 2, the PDF receives (202) radio spectrum block data, wherein radio spectrum block data is defined as data that indicates or identifies a radio spectrum block intended for use by a subscriber/UE after the subscriber successfully connects or attaches to the RAN and for use by the subscriber during a communication session. The radio spectrum block data can have any number of suitable formats depending on the particular system implementation and the complexity of the logic included in the network elements that use this data. Currently, radio spectrum block data is not included in the signaling messages between elements in core networks, such as the LTE EPC 110, which have policy determination and policy enforcement functions.

In one illustrative implementation, the radio spectrum block data comprises some form of radio frequency representation including, but not limited to: an actual frequency such as an identifier of a preferred carrier frequency for use by the UE in a session, wherein the carrier frequency is included in a particular radio spectrum block that the UE is authorized to use; a radio spectrum block representation such as an identifier for a particular radio spectrum block; or a code for a frequency. In another embodiment, the radio spectrum data includes usage data at least for a selected radio spectrum block, for instance, to optimize selection of the radio spectrum block ultimately used by a connecting UE. For example, the usage data communicates or indicates information including, but not limited to, current capacity of a radio spectrum block; current utilization of a radio spectrum block; an amount of congestion in the radio spectrum block; current free spectrum, etc.

As used herein, a radio spectrum block is defined as a range of frequencies within the radio spectrum from which bearers are allocated for use by UE. As such, a radio spectrum block is a logical representation of a particular range of frequencies. However, the logical representation of the range of frequencies for a given radio spectrum block may be deemed a "physical" radio spectrum block when the bearers assigned from the radio spectrum block have a bandwidth that is limited to the range of frequencies associated with the radio spectrum block (e.g., separate physical channels for the D and PSST blocks); as in the case when a plurality of radio spectrum blocks are be shared by multiple core network owners, and/or when a plurality of radio spectrum blocks comprises multiple physical channels.

Or, an eNB may present a single physical channel to a UE having a bandwidth that spans several logical radio spectrum blocks, such that several logical radio spectrum blocks comprise a single physical channel (e.g., a single 10 MHz physical channel comprised logically of the D block and the PSST block); such as when the several logical radio spectrum blocks are licensed by the same core network owner. In such a case, a single operator may own an eNB that provides bearer resources that span across several radio spectrum blocks (the totality of which is also considered herein as a single "physical" radio spectrum block), wherein a single bearer may have a bandwidth that totals the sum of the combined frequency ranges of all the several radio spectrum blocks.

In an embodiment, the radio spectrum blocks are determined by a government agency, such as the FCC; and in one particular embodiment, the radio spectrum blocks are defined by the FCC for the 700 MHz frequency band, which will be described and used as an example to facilitate understanding of the present disclosure. In accordance with this implementation scenario, the 700 MHz frequency band covers the frequency range of 746 MHz to 806 MHz for uplink and downlink bearers. More particularly, adjacent radio spectrum blocks for the 700 MHz frequency band in the downlink bearers (from eNB to UE) comprise: an 11 MHz public commercial broadband radio spectrum block (called C block), which is already licensed to a Carrier for commercial users; an adjacent 5 MHz D block, which has not been licensed; an adjacent 5 MHz public safety broadband radio spectrum block (called a Broadband Public Safety Spectrum Trust (PSST) block since it is licensed to the PSST); and two adjacent 3 MHz narrowband public safety radio spectrum blocks licensed to the PSST. The identically named radio spectrum blocks are designated for the uplink bearers (from UE to eNB) but with different frequency ranges.

As stated above, the D block has not yet been licensed. However, regardless of the entity who receives the license to use the D block, the licensee of the D block and/or public safety users of the PSST block may prefer to share the core infrastructure and bandwidth of the adjacent radio spectrum block in order to improve spectral efficiency for all users and reduce costs for the public safety users. A number of possible scenarios may arise in this illustrative context in which users are authorized to use multiple adjacent frequency blocks. For example, a single Carrier may deploy a single eNB that spans the C, D, and PSST blocks (e.g., a single 20 MHz physical channel with logical frequency blocks of C, D, and PSST or separate physical channels for each frequency block) or that spans the D and PSST blocks (e.g., a single 10 MHz physical channel with logical frequency blocks of D and PSST or separate physical channels for each frequency block), and certain users are authorized for bearer allocation from multiple of these adjacent blocks. In the example LTE embodiment described by reference to FIGS. 3 and 4, it is assumed (for illustrative purposes only) that a single eNB spans the adjacent C, D, and PSST blocks. However, it should be understood that this illustrative implementation does not limit the scope of the core network or adjacent radio spectrum block combinations to which the teachings are applicable.

Turning back to method 200 as described by reference to FIG. 3, as illustrated therein, the PCRF receives the radio spectrum block data via the core infrastructure 110. More particularly, the UE 134 selects 302 a radio spectrum block for attaching to the RAN and sends an initial attach message 304 to the eNB 124, using the selected radio spectrum block, to initiate the signaling sequence for allocating bearer resources. The UE 134 communicates to the eNB (either in the initial attach message 304 or in a separate message) the physical frequency block to which the UE has selected to attach. The physical frequency block might contain one logical radio spectrum block or several logical radio spectrum blocks. In accordance with the present example implementation, the UE 134 selects the physical frequency block that spans the C, D, and PSST logical blocks. It is assumed for purposes of the disclosure that the UE 134 is configured for operating within two or more of these logical radio spectrum blocks, and unique PCC rules (both billing and/or QoS rules) for the UE for each of the radio spectrums the UE is authorized to use is provisioned in the PCRF in accordance with the present teachings to facilitate frequency-based selection of PCC rules.

For example, an operator provisions the PCRF 112 with PCC rules for public users and public safety users as follows. When public user X uses: C block, the user is cannot be pre-empted, and pre-paid charging rules apply; D block, the user can be pre-empted (by public safety), and pre-paid charging rules apply; the public user cannot use the PSST block. When public safety user Y uses: C block, the user cannot pre-empt other users but receives 'public gold' (highest of multiple priorities) priority, and post-paid charging applies; D block, the user can pre-empt public users but not other public safety users, and post-paid charging applies; PS block, the user can pre-empt other public safety users, and receives 'chief of police' (highest of multiple priorities) priority, and charging is disabled. PCC rules can also specify which applications can be used on each radio spectrum block. These example rules illustrate that the PCC rules are frequency-based, i.e., depend on the particular radio spectrum block to which the UE is attached and can further depend on the user's priority status in the RAN and/or other factors including, but not limited to, the user's agency/enterprise and role, incident, block loading, application usage, etc. Moreover, that PCC rules correspond to or are associated with a particular subscriber means that the PCC rules associate policy and/or charging control with a particular UE, the user of the UE or both.

The eNB is provisioned with and/or receives data, in accordance with the teachings herein. In an embodiment, the eNB receives information regarding the type of UE (public or public safety) and the physical and logical blocks preferred by the UE 134. The type of UE is received, for instance, from the UE or from a Home Subscriber Server (HSS) via the MME 118. The UE radio spectrum block preferences can also be received from the HSS via the MME 118. In one example implementation, a public safety user has the following preferred order of radio spectrum block usage: (1) the PSST radio spectrum block; (2) D block; (3) public commercial broadband spectrum block. There may be a default of public commercial broadband spectrum block if a preferred order of radio spectrum blocks is not made available to the eNB.

The eNB 124 further receives via configuration (e.g. using Simple Network Management Protocol (SNMP) or Operations, Administrative, and Maintenance (OAM) tools), the logical block and physical block configuration covered by the eNB. For example, D block and PSST block are shared in a single physical 10 MHz channel or C block, D block, and PSST block are shared in a single physical channel; and the eNB is configured with fifty percent of the physical channel for PSST and fifty percent of the physical channel for D block or one third of the physical channel for each of radio spectrum blocks C, D, and PSST. Upon obtaining this configuration, the eNB can monitor usage and remaining capacity for each of the logical radio spectrum blocks it covers to provide usage data to the PCRF 112.

The eNB further establishes a Non-Access Stratum connection with the MME 118, and passes radio spectrum block data, which indicates the selected radio spectrum block, to the MME 118 in a message (306) over the S1-MME interface. Examples of the format and contents of the radio spectrum block data are described above. This radio spectrum block data is further transferred over the S11 interface (308) between the MME 118 and the SGW 116; over the S5 (or S8) interface (310) between the SGW 116 and the PGW 114; and over the Gx interface (312) between the PGW 114 and the PCRF 112. Transferring the radio spectrum data over the collective interfaces between the UE and the PCRF is an enhancement and novel to these interfaces and the messages sent via these interfaces, over what is currently done in communication systems.

The PCRF 112 uses the radio spectrum block data to determine (204) a radio spectrum block for bearer allocation to the UE for use during its communication session, for instance the D block. As mentioned above, the selected radio spectrum block is one of a plurality of radio spectrum blocks that UE 134 is authorized to use, wherein the UE and or user of the UE has a different and unique set of PCC rules for both billing and QoS corresponding to each of the radio spectrum blocks in this plurality, which are provisioned into the PCRF. In one implementation, the selected radio spectrum block is one selected by the UE and communicated to the PCRF in the radio spectrum block data. In another implementation, the eNB 124 provides to the PCRF 112, in the radio spectrum block data, usage data for one or more radio spectrum blocks and perhaps the physical spectrum block selection of the UE, and the PCRF 112 includes logic and UE preferences and priorities for selecting (204) the radio spectrum block for the UE using the usage data and other information with which the PCRF 112 is provisioned.

The PCRF 112 then selects (206, 314) the set of PCC rules for the UE corresponding to the selected radio spectrum block, and provides these frequency-based rules to the PGW 114 in a message 316 over the Gx interface for applying to communications with the subscriber during a session. To complete a successful initial attach 322 for the UE 134 to the RAN and LTE, the conventional signaling of a create session response 318 over the S5 (or S8) interface and a create session response 320 over the S11 interface is performed. Also, in a commercial embodiment, additional well known signaling is performed over the interfaces shown in FIG. 3 for the successful initial attach, but such signaling is not shown for simplicity of illustration. The PCRF 112, in this embodiment, further stores (208) the radio spectrum block data including any usage data for future radio spectrum block determinations for the UE 134 as needed, for example as described below by reference to FIG. 4. Moreover, optionally, the PCRF 112 provides (210) the usage data to a billing system that interfaces to the PCRF 112 to enable determining of different billing policies and rates for the selected radio spectrum block.

FIG. 3 illustrates an embodiment of the present teachings when the UE initially attaches to the access network and the core network. In another embodiment, as illustrated by reference to the signaling in FIG. 4, the PDF (in this example the PCRF 112), makes policy and charging control decisions based on radio spectrum blocks after initial attachment and in response to one or more triggers. Accordingly, the UE 134, has a successful initial attachment (404) to the radio spectrum block (e.g., the D block) selected by the PCRF 112. Some time thereafter, the PCRF 112 receives (212) a trigger that causes the PCRF to determine whether the selected radio spectrum block continues to be the best or optimal radio spectrum block for the UE 134 communications.

By way of example only, and not to provide an exhaustive list of possible triggers, the trigger can be one or more of the following: a request, from the application function 130, to modify the UE's active session; a request from the UE 134 to modify its session (e.g., via standard 3GPP LTE signaling); a request from the UE 134 to change to a different radio spectrum block; an indication from an access network (e.g., RAN 120) serving the selected radio spectrum block that new bearers cannot be established; an indication of congestion from the access network serving the selected radio spectrum block; an indication from the access network serving a different radio spectrum block, which the UE is authorized to use, that capacity is available; and/or an indication from the access network serving the different radio spectrum block, which the UE is authorized to use, radio spectrum block that support for a user desired service is available, where the service can be an application or other function. This embodiment enables bearers to be reallocated to different radio spectrum blocks as conditions in the RAN change.

In the implementation illustrated by reference to FIG. 4, the trigger (406) received by the PCRF 112 is, for example, a request from the AF 130 to modify the UE's session by attempting to initiate a new media flow. The request (406) is included in a message over the Rx interface, for instance in a message that is compatible with the 3GPP TS for LTE. Responsive to trigger, the PCRF 112: retrieves (214) previously stored usage data for current D block (which could have been updated by the RAN since the UE's initial attachment and retrieves any stored usage data for other preferred radio spectrum blocks of UE 134; examines device authorizations (for applications and radio spectrum blocks); examines the new media being requested by application in light of the usage data and UE authorizations; and determines (214) whether to switch to a different radio spectrum block to accommodate the request (406) from the AF 130.

In some instances, the PCRF will determine (408) that a different radio spectrum block is optimal. In this case, the UE is a public safety UE that was initially attached to the commercial D block, and the PCRF determines that capacity is now available in the PSST block and determines that the UE 134 bearers should be switched to the PSST block. The PCRF sends a response (410) to the AF 130 accepting the modified session (which can be a standard message over the Rx interface) and initiates an instruction (216, 412) to the UE 134 to switch to the PSST block. The instruction is sent over the Gx, S5/S8, S11, and S1-MME interfaces and communicated by the eNB to the UE. The format of the message can take the form of a modified message compatible with the 3GPP TS for LTE or a proprietary message. In response to the instruction to switch radio spectrum blocks, the UE has two options. The non-graceful option is for the UE to drop all existing bearers and re-attach to the new radio spectrum block. On the other hand, a presumably more graceful approach is for the UE and eNB to just manage the change without removing any existing bearers. Consequently, signaling (e.g., standard 3GPP LTE signaling) ensues between the UE 134, the eNB/EPC 402, the PGW 114, and the PCRF 112 (e.g., modify session requests) to attach (416) the UE 134 to the PSST block. In addition, the PCRF 112 sends and selects (218) to the PGW 114, over the Gx interface, the frequency-based PCC rules (418) for the UE for the PSST block to apply to communications with the UE 134 during the modified session.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for establishing a dedicated bearer described herein. The non-processor circuits may include, but are not limited to, a radio receiver, a radio transmitter, signal drivers, clock circuits, power source circuits, and user input devices. As such, these functions may be interpreted as steps of a method to perform the establishing of a dedicated bearer described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for policy and charging control decisions based on radio spectrum blocks, the method comprising:
   a policy determination function performing:
   receiving radio spectrum block data;
   determining, using the radio spectrum block data, a first radio spectrum block for use during a session for a subscriber, wherein the first radio spectrum block is one of a plurality of radio spectrum blocks of a same radio access network technology, and wherein the subscriber has a unique set of policy and charging control rules corresponding to each of the radio spectrum blocks in the plurality of radio spectrum blocks of the same radio access network technology; and
   selecting and providing to a policy enforcement function the set of policy and charging control rules for the subscriber corresponding to the first radio spectrum block, for applying to communications with the subscriber during the session.

2. The method of claim 1, wherein the plurality of radio spectrum blocks comprises at least two of: a public commercial broadband radio spectrum block; a public safety broadband radio spectrum block; and a D block.

3. The method of claim 2, wherein the public commercial broadband radio spectrum block is a C block of a 700 MHz frequency band, and the public safety broadband radio spectrum block is a Broadband Public Safety Spectrum Trust (PSST) block of the 700 MHz frequency band.

4. The method of claim 1, wherein the plurality of radio spectrum blocks is shared by multiple core network owners.

5. The method of claim 1, wherein the plurality of radio spectrum blocks comprises a single physical channel.

6. The method of claim 1, wherein the policy determination function comprises a Policy and Charging Rules Function, and the radio spectrum block data is received from a Packet Data Network Gateway over a Gx interface.

7. The method of claim 6, wherein the radio spectrum block data is transferred over an S1-MME interface, over an S11 interface, and over one of an S5 or an S8 interface to the Packet Data Network Gateway.

8. The method of claim 1, wherein the first radio spectrum block is selected by the subscriber and communicated to the policy determination function in the radio spectrum block data.

9. The method of claim 1, wherein the radio spectrum block data comprises an identifier for the first radio spectrum block.

10. The method of claim 1, wherein the radio spectrum block data comprises an identification of a carrier frequency for use in the session, wherein the carrier frequency is included in the first radio spectrum block.

11. The method of claim 1, wherein the radio spectrum block data comprises usage data for at least one of the plurality of radio spectrum blocks and the first radio spectrum block is determined based on the usage data.

12. The method of claim 11 further comprising providing the usage data to a billing system to enable the determining of different billing policies and rates for the first radio spectrum block.

13. The method of claim 1 further comprising:
the policy determination function performing:
receiving a trigger;
responsive to the trigger, retrieving the radio spectrum block data and determining to switch to a second radio spectrum block in the plurality;
providing an instruction to the subscriber to attach to the second radio spectrum block; and,
selecting and providing to the policy enforcement function, the set of policy and charging control rules for the subscriber corresponding to the second radio spectrum block for applying to communications with the subscriber during the session.

14. The method of claim 13, wherein the trigger comprises at least one of:
a request from an application function to modify the session;
a request from the subscriber to modify the session;
a request from the subscriber to change to a different radio spectrum block;
an indication from an access network serving the first radio spectrum block that new bearers cannot be established;
an indication of congestion from the access network serving the first radio spectrum block;
an indication from an access network serving the second radio spectrum block that capacity is available; or
an indication from the access network serving the second radio spectrum block that support for a user desired service is available.

15. The method of claim 1, wherein the plurality of radio spectrum blocks comprises multiple physical channels.

16. A policy determination function comprising:
an interface for receiving radio spectrum block data; and
a processing device for:
determining, using the radio spectrum block data, a first radio spectrum block for use during a session for a subscriber, wherein the first radio spectrum block is one of a plurality of radio spectrum blocks of a same radio access network technology, and wherein the subscriber has a unique set of policy and charging control rules corresponding to each of the radio spectrum blocks in the plurality of radio spectrum blocks of the same radio access network technology;
selecting and providing to a policy enforcement function the set of policy and charging control rules for the subscriber corresponding to the first radio spectrum block, for applying to communications with the subscriber during the session;
receiving a trigger;
responsive to the trigger, retrieving the radio spectrum block data and determining to switch to a second radio spectrum block in the plurality of radio spectrum blocks of the same radio access network technology;
providing an instruction to the subscriber to attach to the second radio spectrum block; and,
selecting and providing to the policy enforcement function, the set of policy and charging control rules for the subscriber corresponding to the second radio spectrum block for applying to communications with the subscriber during the session.

17. The policy determination function of claim 16, wherein the interface comprises a Gx interface, the policy determination function comprises a Policy and Charging Rules Function, and the policy enforcement function comprises a Packet Data Network Gateway.

* * * * *